United States Patent [19]

Winkler

[11] Patent Number: 4,557,031

[45] Date of Patent: Dec. 10, 1985

[54] PROCESS FOR PRODUCING PERMANENT ART WORK DISPLAY

[76] Inventor: Charles R. Winkler, P.O. Box 2161, Kill Devil Hills, N.C. 27948

[21] Appl. No.: 544,721

[22] Filed: Oct. 24, 1983

[51] Int. Cl.[4] .............................................. B23P 11/00

[52] U.S. Cl. ........................................ 29/432; 29/460; 156/92; 156/307.7

[58] Field of Search .............. 428/102, 103, 13, 542.4; 29/460, 432; 156/92, 305, 307.7; 264/257

[56] References Cited

U.S. PATENT DOCUMENTS 4,225,647 9/1980 Parent .............................. 428/542.4

OTHER PUBLICATIONS

"Decopour" product bulletin, The Flecto Company, Inc., 1974.

*Primary Examiner*—Evan K. Lawrence
*Attorney, Agent, or Firm*—Mills and Coats

[57] ABSTRACT

A process for preserving art works which otherwise would be lost after a normal wear period. The process includes removing of art work from a T-shirt or similar piece of wearing apparel and laminating the same with a curable transparent resin on a backing to form a permanent display for the art work.

9 Claims, 6 Drawing Figures

PROCESS FOR PRODUCING PERMANENT ART WORK DISPLAY

FIELD OF INVENTION

This invention relates to laminating processes and more particularly to the preserving of art forms which appear on apparel.

BACKGROUND OF INVENTION

At every level of society the T-shirt has obtained the position of prominence as a vehicle through which a person's individuality is conveyed. Also as a means of advertising, publicizing, and classifying, the T-shirt has risen in the past fifteen years to a place of unique cultural significance. Every facet of society uses the T-shirt not only as an article of clothing, but also as a form of self-expression. Advertisers have seized on the shirt as a formidable vehicle upon which they graphically illustrate their concepts and promotional techniques.

Because of the limited wear/life of apparel and particularly T-shirts, the art created thereon has not developed into a mature art form. Additionally the sentimental attachment gained while a particular art work on a T-shirt is being worn is lost when the wear/life of the T-shirt or other decorated apparel has ended.

SUMMARY OF THE INVENTION

After much research and study into the above-mentioned problems, the process of the present invention has been developed to preserve the art which has heretofore been lost at the end of the wear/life period. This in actuality is creating a new art form by preserving the original temporary art work with the added advantage of the sentimental value gained during the wear period. This process enhances and transforms the original T-shirt art into a permanent rendering thus preserving the grass roots cultural phenomenon and turning it into a new art form which is characteristically American in nature.

The above is accomplished through the mounting of the art work on the T-shirt or other wearing apparel permanently to a backing and encapsulating the same with a transparent material without discoloration or other undesirable degradation of the same.

In view of the above it is an object of the present invention to provide a method of permanently preserving normally temporary art forms.

Another object of the present invention is to provide a preservation method which is suitable for use in conjunction with woven fabrics.

Another object of the present invention is to provide a means for permanently preserving a decorated fabric without discoloration and distortion of the original colors and configurations.

Another object of the present invention is to provide a simple and yet inexpensive method of preserving art forms appearing on fabric materials.

Another object of the present invention is to provide a process for preserving fabrics and similar materials in a form approaching the original in visual stimulation.

Other objects and advantages of the present invention will become apparent and obvious from a study of the following description and the accompanying drawings which are merely illustrative of such invention.

DETAILED DESCRIPTION OF INVENTION

Figure 1:
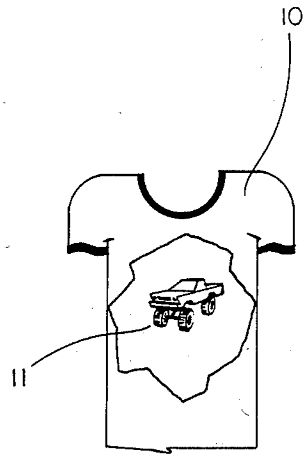
FIG. 1 is an elevational view of a typical piece of wearing apparel with graphics thereon.
Figure 2:
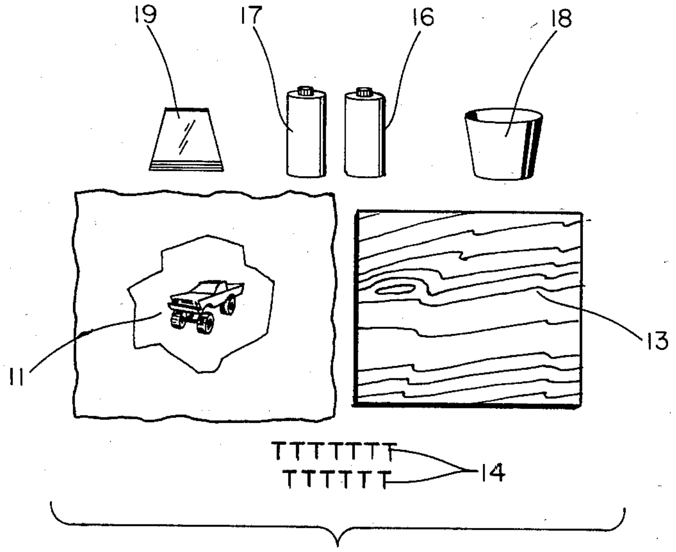
FIG. 2 is a composite of the various items used in the process of the present invention.
Figure 3:
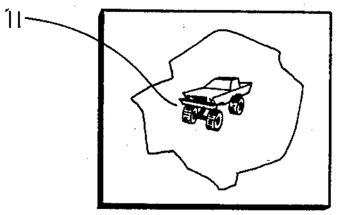
FIG. 3 is an elevational view of the graphics mounted on a backing.

With further reference to the drawings, FIG. 1 illustrates a typical T-shirt type garment 10 having graphics 11 displayed thereon.

Whenever the T-shirt 10 has served its wear/life period, a switch of the same 12 is cut out surrounding the graphics 11. A backing 13 preferably formed from $\frac{1}{8}$ inch thick plywood cut into a 12 inch by 12 inch square is provided along with tacks, staples or other securing means indicated at 14. Also provided is a resin compound 15 composed of resin 16 and hardener 17. This resin compound is preferably of the reactive polymer type. One such product is sold under the trade name of Decopour produced by Flecto International, Ltd., of Oakland, California. This product is a reactive polymer compound mixed 1:1. It cures to a thick glossy coating in about four to six hours at 68 to 80 degrees Fahrenheit and reaches full strength and toughness in about seven days. This durable material requires no polishing to produce a high gloss. It is clear and one coat is all that is usually required for a luxurious finish. Additional coats may be applied after allowing the previous coat to cure six to eight hours.

The final item necessary to accomplish the process of the present invention is a mixing container such as that indicated at 18.

To produce the permanent art work display of the present invention, the design or other graphics 11 of the T-shirt or other apparel 10 is removed therefrom in a single swatch 12 leaving as much room as possible around the design. The design swatch 12 is then laid out on the backing 13 and is centered thereon. The swatch is then smoothed out to remove all wrinkles but not stretched to the point of distorting the graphic design thereon.

Figure 4:
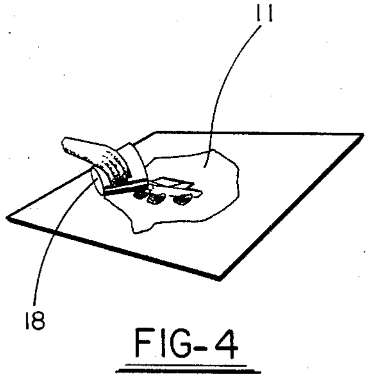
FIG. 4 is a perspective view of the resin compound being poured onto the graphics.
Figure 5:
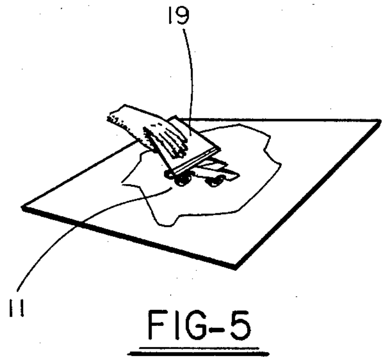
FIG. 5 is a perspective view of the resin compound being spread over the graphics.
Figure 6:
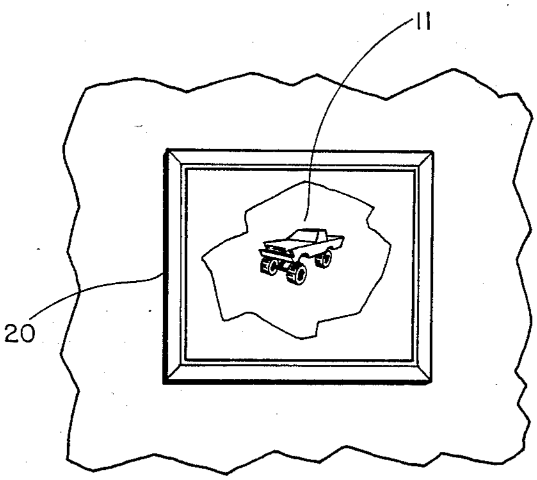
FIG. 6 is an elevational view showing the graphics in final mounted form.

After the swatch has been centered and smoothed out, the cloth is folded over and secured to backing 13, by tacks, staples or other securing means 14. Care at this point must be taken to insure proper positioning of the graphic design 11 and a taunt fit on the front of backing 13 without distortion. The resin and hardener 16 and 17 are combined in container 18 and are throughly mixed to form resin compound 15. This compound is then poured onto the center portion of the mounted swatch as illustrated in FIG. 4.

Next the resin compound is spread evenly toward the edges of the mounted swatch by means such as spreader 19, taking care to insure penetration through the fabric without the accumulation of air bubbles. A full even spreading of the resin is required to achieve the desired results.

The backing 13 with its now fixed fabric swatch 12 is allowed to cure for a period of approximately four hours and then it is ready for framing as illustrated at 20. The long worn, sentimental design has now been permanently preserved and can be mounted on a wall 21 or other similar display means. As a collection these art works are made, the sentimental value to the collector is such that times past can be relived each time the display is viewed.

From the above it can be seen that the present invention has the advantage of providing a relatively inexpensive and yet highly efficient means of permanently preserving art work forms which heretofore have been disposed of when their wear/life was over. The process by which the preservation is accomplished is relatively simple and yet highly efficient in accomplishing the desired results.

The present invention may, of course, be carried out in other specific ways than those set forth without departing from the spirit and essential characteristics of the invention. The present embodiments are, therefore, to be considered in all respects as illustrative and not restrictive, and all changes coming within the meaning and equivalency range of the appended claim are intended to be embraced therein.

What is claimed is:

1. A preserving process comprising:

providing wearing apparel fabric containing a normally limited life art work thereon; cutting a swatch containing said art work from said apparel; placing the swatch on a backing means having edges; smoothing out the swatch to remove wrinkles therefrom without distorting the art work; folding the swatch over the edges of the backing; securing the swatch to the backing means at points other than the side having the art work thereon, whereby the art form bearing swatch is mounted on the backing means; combining a reactive resin and a hardener to form a curable resin compound, said resin compound being transparent when cured; pouring the resin compound generally in the center of the art work; evenly spreading the resin toward the edges of the mounted swatch with penetration of the fabric and without air bubbles; and allowing the spread resin compound to cure whereby the normally limited life art work is permanently preserved by being penetratingly encapsulated by said transparent compound.

2. The process of claim 1 wherein the fabric having the art form appearing thereon is a T-shirt type garment.

3. The process of claim 1 wherein the swatch is secured to the backing means with tacks.

4. The process of claim 1 wherein the swatch is secured to the backing means with staples.

5. The process of claim 1 wherein the reactive resin is a polymer.

6. The process of claim 1 wherein the spread resin compound is allowed to cure for approximately four hours.

7. The process of claim 1 wherein the backing means is a piece of wood.

8. The process of claim 1 wherein the backing means is a piece of plywood.

9. The process of claim 8 wherein the plywood backing means is formed preferably from between one-fourth and one-eight inch thick plywood.

* * * * *